US006611663B2

(12) United States Patent
Nakagawa

(10) Patent No.: US 6,611,663 B2
(45) Date of Patent: Aug. 26, 2003

(54) CAMERA HAVING VARIABLE MAGNIFICATION WHERE LIGHT DISTRIBUTION ANGLE AND FIELD ANGLE ARE UNCHANGEABLE DURING FOCUSING

(75) Inventor: Kazuo Nakagawa, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 09/951,368

(22) Filed: Sep. 13, 2001

(65) Prior Publication Data

US 2002/0044771 A1 Apr. 18, 2002

(30) Foreign Application Priority Data

Sep. 21, 2000 (JP) .......................................... 2000-287466

(51) Int. Cl.[7] ............................ G03B 15/02; G03B 13/10
(52) U.S. Cl. ........................... 396/62; 396/177; 396/379
(58) Field of Search .............................. 396/61, 62, 173, 396/176, 177, 178, 373, 378, 379

(56) References Cited

U.S. PATENT DOCUMENTS 6,072,954 A * 6/2000 Onda .......................... 396/175
6,252,628 B1 * 6/2001 Kobayashi ................ 348/240.3

OTHER PUBLICATIONS

Camera Having Zoom Flash Device, U.S. patent application Publication, US 2001/0028792 A1, Publication Date Oct. 11, 2001.*

* cited by examiner

Primary Examiner—Russell Adams
Assistant Examiner—Arthur A Smith
(74) Attorney, Agent, or Firm—Robin, Blecker & Daley

(57) ABSTRACT

The present invention provides a camera comprising a cam member having cam groves formed for moving lens units, where the cam groves alternately have variable power cam regions for moving the lens units for variable power and focusing cam regions for moving the lens units for focusing, an illumination device whose light distribution angle is changeable, and a finder device whose angle is changeable wherein the light distribution angle of the illumination device and the field angle of the finder device are changed while the lens units move in the variable power cam regions for variable power, and on the other hand, the light distribution angel of the illumination device and the field angle of the finder device are not changed while the lens units move in the focusing cam regions for focusing.

5 Claims, 13 Drawing Sheets

CAMERA HAVING VARIABLE MAGNIFICATION WHERE LIGHT DISTRIBUTION ANGLE AND FIELD ANGLE ARE UNCHANGEABLE DURING FOCUSING

BACKGROUND OF THE INVENTION

1. Field of the Invention

The present invention relates to a camera in which the strobe light distribution angle and finder field angle are changed under interlocking with the zooming operations of the photographic optical system.

2. Description of the Related Art

Small-sized and lightweight strobe-built-in cameras have been conventionally used for various purposes, and in particular, most so-called compact cameras whose main purpose of use is to take snapshots have strobe devices installed inside.

In addition, many recent compact cameras have zoom lenses for the purpose of improvement in function, and in accordance with this tendency, many strobe devices have been developed to be conformable to zooming so that proper light intensities are obtained at each focal length of the photographic lens and the strobe light reaches further by increasing the size of the capacitor of the light emitting circuit to increase the light intensity.

Furthermore, many cameras with zoom lenses are constructed so that the field angle of the finder is changed under interlocking with the zoom lens in order to notify a photographer of the photographic field angle by means of the zoom lens.

For example, the camera with a zoom strobe and zoom finder proposed in Japanese Unexamined Patent Publication No. H6-18967 is constructed so that, when the zooming lens group for zooming operations is driven, the lens barrel holding the zooming lens group is rotated, the cam plate is driven up and down by the gear interlock, and the strobe device and finder device executes zooming operations following cam grooves formed in this cam plate.

In the camera proposed in the abovementioned patent publication, since the lens barrel mechanism is divided into a zooming mechanism and a focusing mechanism, the strobe device and the finder device are only interlocked with the zooming mechanism, and thereby, proper strobe light distribution and finder field angle are obtained at each focal length.

However, in order to construct the zooming mechanism and focusing mechanism separate from each other, normally, the focusing mechanism must be constructed so that a lens group for focusing operations is provided inside the zooming mechanism and driven by an exclusive drive source. Therefore, there are problems in this case such that the lens barrel mechanism becomes complicated, the cost increases, and the size of the lens barrel increases in order to install the focusing mechanism inside the lens barrel.

Therefore, recently, for the purpose of simplification and downsizing of the mechanisms, a camera has been proposed which is provided with a lens barrel, so-called, a step-zooming lens barrel that is constructed so that step-zooming of photographic lens and focusing at each zooming step are carried out by using a steplike cam alternately having zooming drive cam regions and focusing drive cam regions.

However, in the abovementioned step-zooming lens barrel, since the zooming mechanism and focusing mechanism are united together, if the strobe device is merely interlocked with the lens barrel, the strobe light distribution angle also changes when focusing, and the light intensity distribution and guide number changes depending on the focusing position, resulting in unevenness in quality of photographs taken.

Also, if the finder device is merely interlocked with the lens barrel, the finder field angle also changes when focusing, and this may give a feeling of incompatibility to the photographer. The present inventor proposed a technique for preventing changes in the strobe light distribution characteristics when focusing in Ser. No. 766,709 (applied on Jan. 22, 2001). Also, the technique disclosed in Japanese Unexamined Patent Publication No. H11-183776 is generally known.

SUMMARY OF THE INVENTION

Therefore, the object of the invention is to always obtain an optimum strobe light distribution angle and finder field angle by a simple construction in a camera with a step-zooming lens barrel. In addition, another object is to provide a camera in which the finder field angle is not allowed to change when focusing.

A camera according to one aspect of the invention comprises: a cam member with cam grooves for moving lens units, where the cam grooves alternately have variable power cam regions which move the lens units for variable power, and focusing cam regions which move the lens units for focusing; an illumination device whose light distribution angle is changeable; a finder device whose field view is changeable; an illumination device drive mechanism constructed so as to change the light distribution angle of the illumination device while the lens units move in the variable power cam regions for variable power, and prevent the illumination device from changing its light distribution angle while the lens units move in the focusing cam regions for focusing; and a finder device drive mechanism constructed so as to change the field angle of the finder device while the lens units move in the variable power cam regions for variable power under interlocking with the cam member, and prevent the finder device from changing its field angle while the lens units move in the focusing cam regions for focusing.

The finder device drive mechanism comprises at least two finder lens units and a finder cam member having cam grooves in which the finder lens units slide. The finder device drive mechanism drives the finder cam member while the lens units move in the variable power cam regions for variable power, and does not drive the finder cam member while the lens units move in the focusing cam regions for focusing.

BRIEF DESCRIPTION OF THE DRAWINGS

The foregoing and other features and advantages of the present invention will become more readily appreciated as the same becomes better understood by reference to the following detailed description when taken in conjunction with the accompanying drawings wherein.

DETAILED DESCRIPTION OF THE PREFERRED EMBODIMENTS

Figure 1:
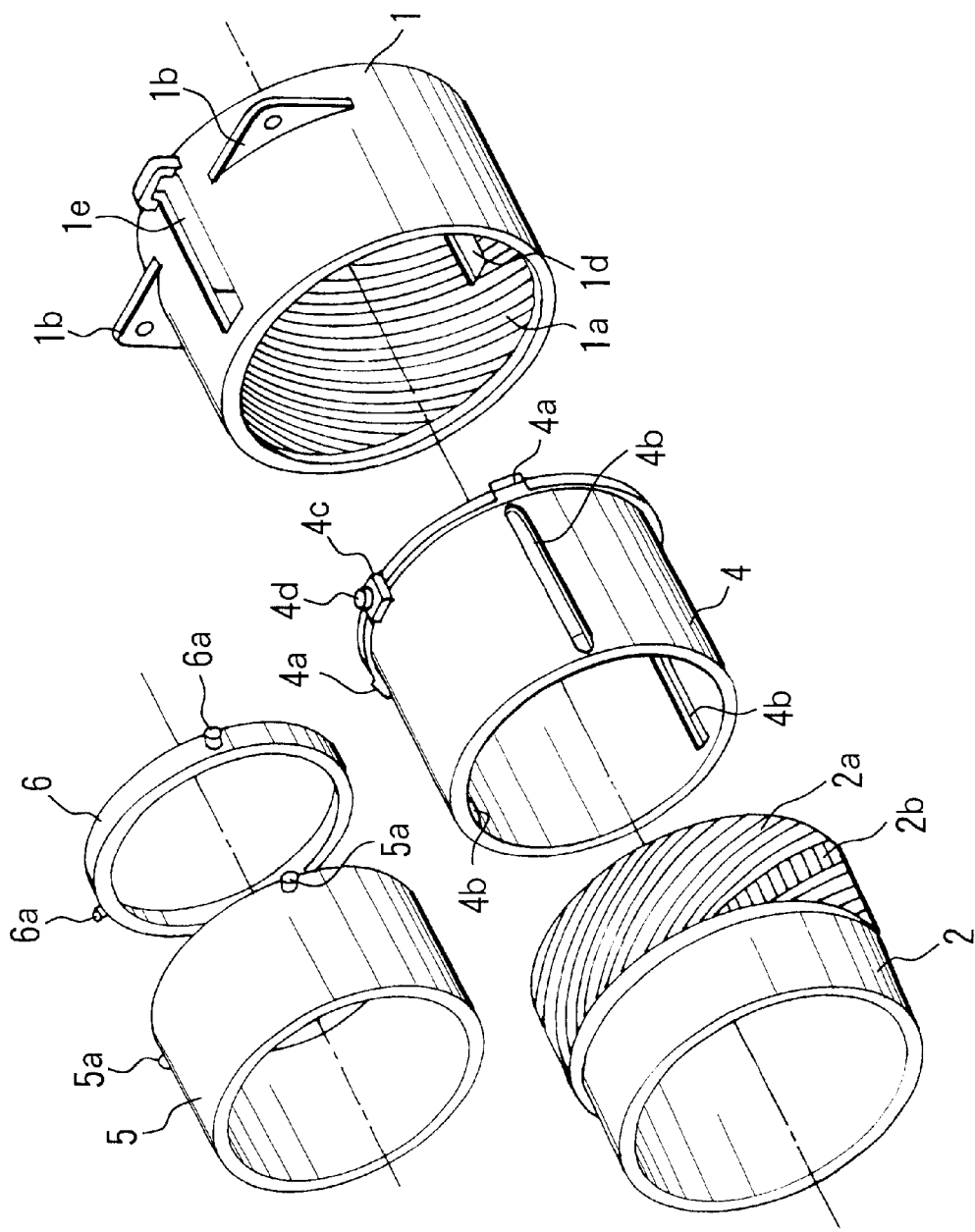
FIG. 1 is a perspective view showing the schematic mechanism of the step-zooming lens barrel of the camera of an embodiment of the invention.
Figure 2:
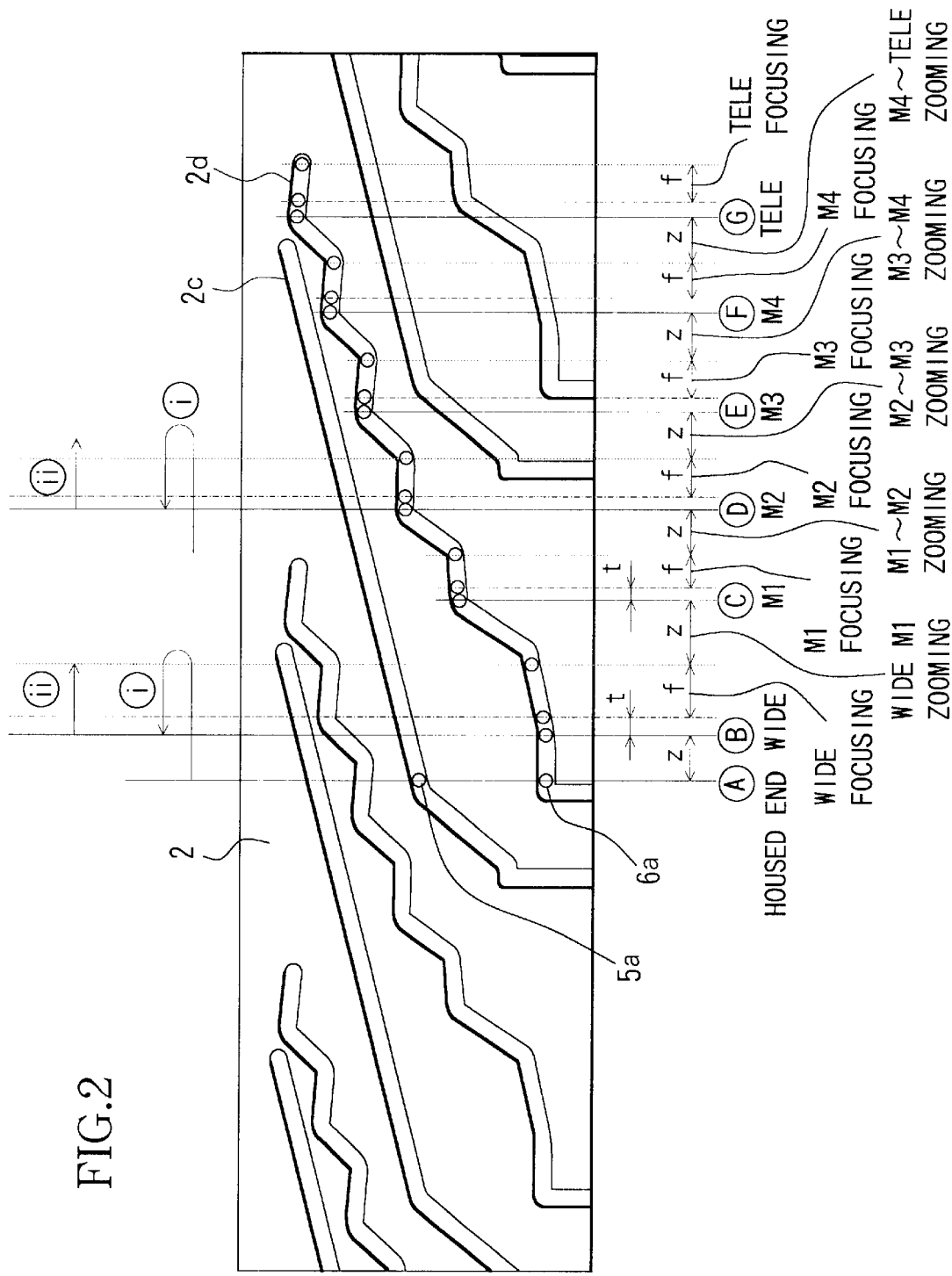
FIG. 2 is an inner circumference developed view of the cam barrel of the abovementioned step-zooming lens barrel.
Figure 3:
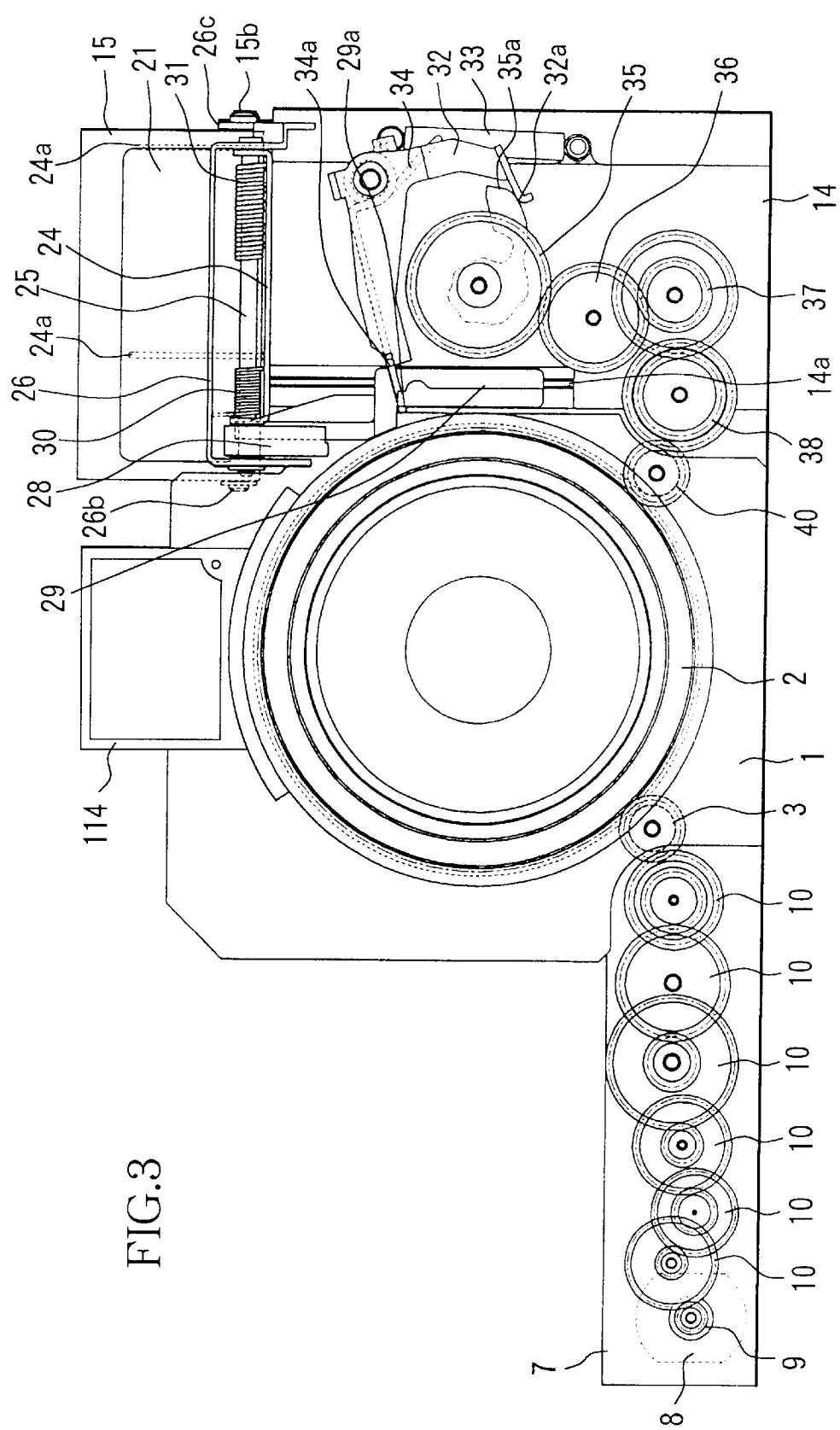
FIG. 3 is a front view showing the schematic mechanism of the abovementioned camera in the condition where the lens barrel is at the housed position.

FIG. 1 through FIG. 3 show the construction of a step-zooming lens barrel provided for a camera of an embodiment of the invention. FIG. 1 shows an exploded view of the step-zooming lens barrel, and FIG. 2 shows a developed view of the step-zooming lens barrel. FIG. 3 shows the construction of the camera in the condition where the step-zooming lens barrel is at the housed position.

In these drawings, the numerical reference 1 denotes a fixed lens barrel, and female helicoid 1a is formed at the inner circumference of the barrel, fixing flange portions 1b are formed at the outer circumference of the barrel. A plurality of key grooves 1d extending in the optical axial direction are formed at the inner circumference of the barrel.

The numerical reference 2 denotes a cam barrel, and male helicoid 2a that helicoid-joins with the female helicoid 1a of the fixed lens barrel 1 is formed at the rear outer circumference of the cam barrel. At the portion with this male helicoid 2a formed, spiral gear 2b is also formed along the helicoid lead. This spiral gear 2b engages with drive gear 3 that is long in the shape of a bar and disposed so that a part of the drive gear protrudes inside the fixed lens barrel 1 as shown in FIG. 3 in the condition where the fixed lens barrel 1 helicoid-joins with the cam barrel 2.

At the inner circumference of the cam barrel 2, rectilinear barrel 4 is housed, which fits the cam barrel 2 in a manner enabling it to relatively rotate about the optical axis and is fixed so as not to come off the cam barrel 2 in the optical axial direction. At the outer circumference of this rectilinear barrel 4, a plurality of keys 4a are formed, which slidably engage with the key grooves 1d of the fixed lens barrel 1. Therefore, when the cam barrel 2 that has received a turning force from the drive gear 3 advances from or retreats toward the fixed lens barrel 1 in the optical axial direction in accordance with the helicoid action while rotating, the rectilinear barrel 4 advances from or retreats toward the fixed lens barrel 1 together with the cam barrel 2 in the optical axial direction without rotating.

At the inner circumference of the rectilinear barrel 4, first lens unit frame 5 for holding the first lens unit (not shown in FIGS. 1–3) and second lens unit frame 6 for holding the second lens unit (not shown) are housed. A shutter opening and closing mechanism and a lens protruding mechanism for focusing that are not shown are also housed.

A plurality of cam pins 5a and 6a are attached to the outer circumferences of the lens frames 5 and 6, and these cam pins 5a and 6a slidably engage with slots 4b formed in the rectilinear barrel 4 so as to extend in the optical axial direction. Therefore, the lens frames 5 and 6 are movable in the optical axial direction without rotating with respect to the rectilinear barrel 4.

At the inner circumference of the cam barrel 2, the cam pins 5a and 6a that penetrate the slots 4b engage, and cam grooves 2c and 2d are formed to guide the pins so as to satisfy the optical conditions in accordance with rotation of the cam barrel 2 (see FIG. 2). These cam grooves 2c and 2d are provided with the same number as that of the cam pins 5a and 6a.

When the lens barrel protrudes from the condition where it stops at each zooming position described later, the space between the first lens unit and the second lens unit is expanded by the cam grooves 2c and 2d, so that focusing is made at the closest side when the lens barrel protrudes forward, and focusing is made at the infinity side when the lens barrel draws backward.

Each of these cam grooves 2c and 2d forms one long groove formed of zooming drive cam regions z and focusing drive cam regions f repeated alternately, whereby the lens barrel serves as a so-called step-zooming lens that can carry out step-zooming and focusing at each zooming position (zooming step) by rotation of the cam barrel 2.

In FIG. 3, reduction gear base plate 7 holds reduction gear rows 10, and motor 8 inputs drive forces into the reduction gear rows 10 via pinion gears 9 to drive the lens barrel.

By the abovementioned construction, the turning force of the motor 8 is transmitted to the cam barrel 2 via the pinion gear 9, reduction gear rows 10, and drive gear 3, and the cam barrel 2 advances from or retreats toward the fixed lens barrel 1 while rotating. Thereby, a differential type zooming lens barrel is constructed in which the cam barrel 2 and rectilinear barrel 4 protrude from the fixed lens barrel 1 in a united manner, and furthermore, the lens frames 5 and 6 advance and retreat inside the cam barrel 2 and rectilinear barrel 4.

The double gear of the reduction gear rows, which engages with the drive gear 3, has a clutch mechanism installed inside, and transmits a turning force of the motor 8 transmitted to one gear to the drive gear 3 via another gear connected to the abovementioned one gear. On the other hand, when an external force is applied to the lens barrel and a load over a predetermined load is applied in the rotation direction of the other gear, the connection between the one gear and the other gear is cut, the external load from the lens barrel is prevented from being transmitted from the reduction gear rows 10 to the motor 8, whereby the gear rows 10 and motor 8 are protected.

As shown in FIG. 1, base part 4c is formed at the upper side of the rear end in the optical axial direction of the rectilinear barrel 4, and columnar cam pin 4d is formed on the upper surface of this base part 4c. The cam pin 4d is movably inserted into and penetrates groove 1e formed to extend in the optical axial direction at the upper portion of the fixed lens barrel 1, and the pin moves in the optical axial direction in accordance with advance and retreat of the rectilinear barrel 4 in the optical axial direction.

The position of the cam pin 4d corresponds to the positions of the lens frames 5 and 6, so that, by detecting the position of the cam pin 4d, the focal length of the photographic lens can be detected.

In the same manner as with the drive gear 3, a part of driven gear 40 protrudes inside the fixed lens barrel 1, and this driven gear 40 engages with spiral gear 2b of the cam barrel 2. Therefore, when the cam barrel 2 rotates, the rotation is transmitted to the driven gear 40, and the driven gear rotates. The amount of rotation of the driven gear 40 corresponds with the angle of rotation of the cam barrel 2, so that the focal length of the photographic lens also can be detected by detecting the angle of rotation of the driven gear 40.

The zooming positions of the camera of the present embodiment are the six positions shown by circled "B", "C", "D", "E", "F", and "G" in FIG. 2. The position shown by circled "A" in FIG. 2 is at the housed position of the camera, and the position shown by circled "B" is a wide position.

As mentioned above, the regions shown by z of the cam grooves 2c and 2d are zooming drive cam regions (barrel housed position-WIDE zooming, WIDE-M1 zooming, M1–M2 zooming, M2–M3 zooming, M3–M4 zooming, and M4-TELE zooming) for zooming between the zooming positions by driving the first and second lens units. The regions shown by fare focusing drive cam regions (WIDE focusing, M1 focusing, M2 focusing, M3 focusing, M4 focusing, and TELE focusing) for focusing at each zooming position by driving the first and second lens units.

Between the zooming drive cam regions z and the focusing drive cam regions f of the cam grooves 2c and 2d, regions t (non-focusing drive cam regions) that are not concerned with focusing are formed for making movements smooth for the cam pins 5a and 6a between the zooming drive cam regions z and focusing drive cam regions f.

Herein, in the zooming sequence in this camera, as shown by the circled arrow (i) in FIG. 2, the cam barrel 2 is driven so that the first and second lens units are moved to positions over the focusing drive cam regions f at new zooming positions, and then returned to the zooming stop positions (focusing standby positions) near the boundaries between the zooming drive cam regions z and the non-focusing drive cam regions t at the new zooming positions.

In the focusing sequence, as shown by the circled arrow (ii) in FIG. 2, the lens units are advanced from the focusing standby positions to the focusing drive cam regions f (the amount of protrusion differs depending on the results of measurement of the subject distance). Then, after opening or closing the shutter, the first and second lens units are returned to the focusing standby positions.

Figure 4:
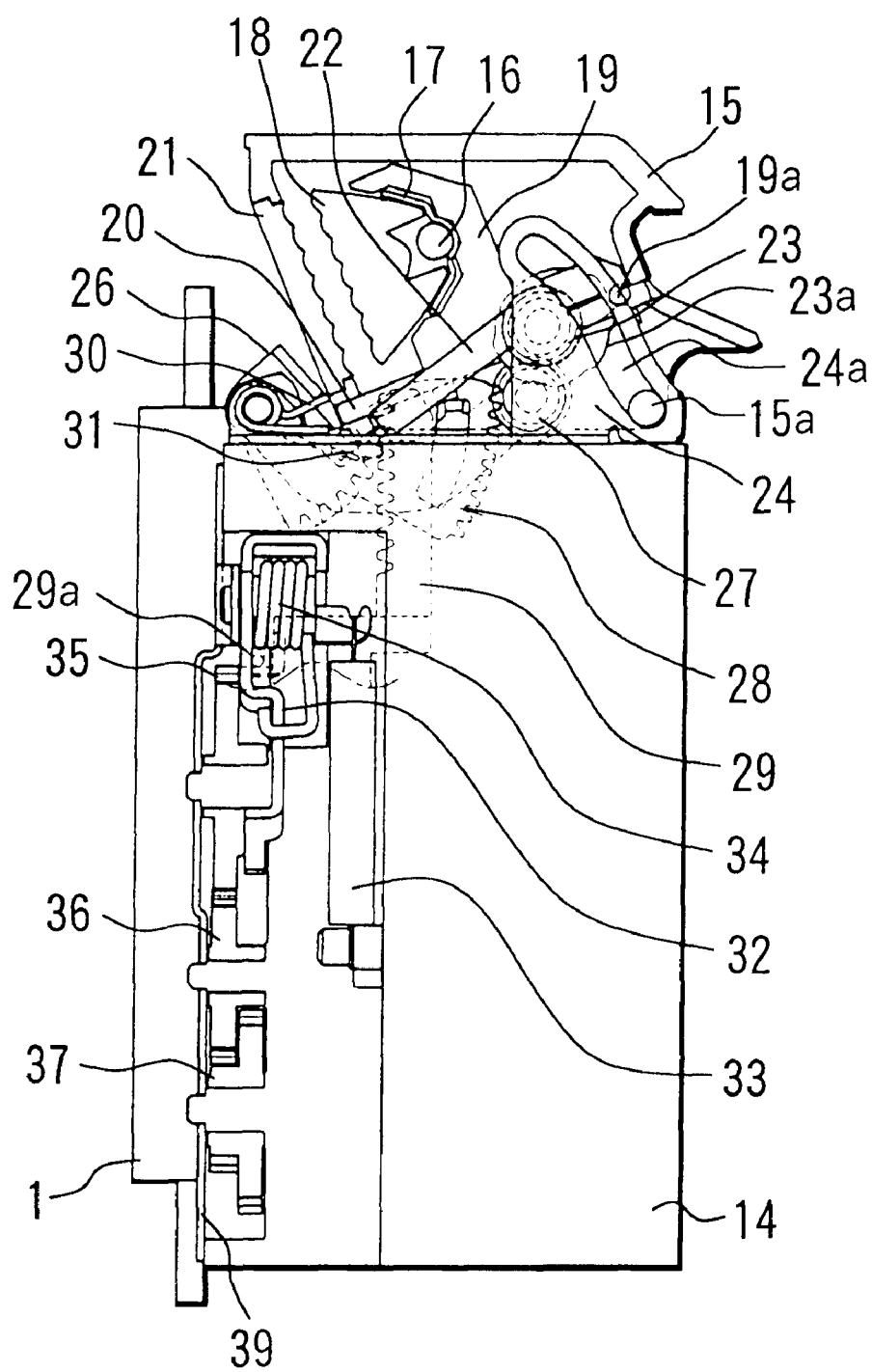
FIG. 4 is a side view showing the schematic mechanism of the abovementioned camera in the condition where the lens barrel is at the housed position.
Figure 5:
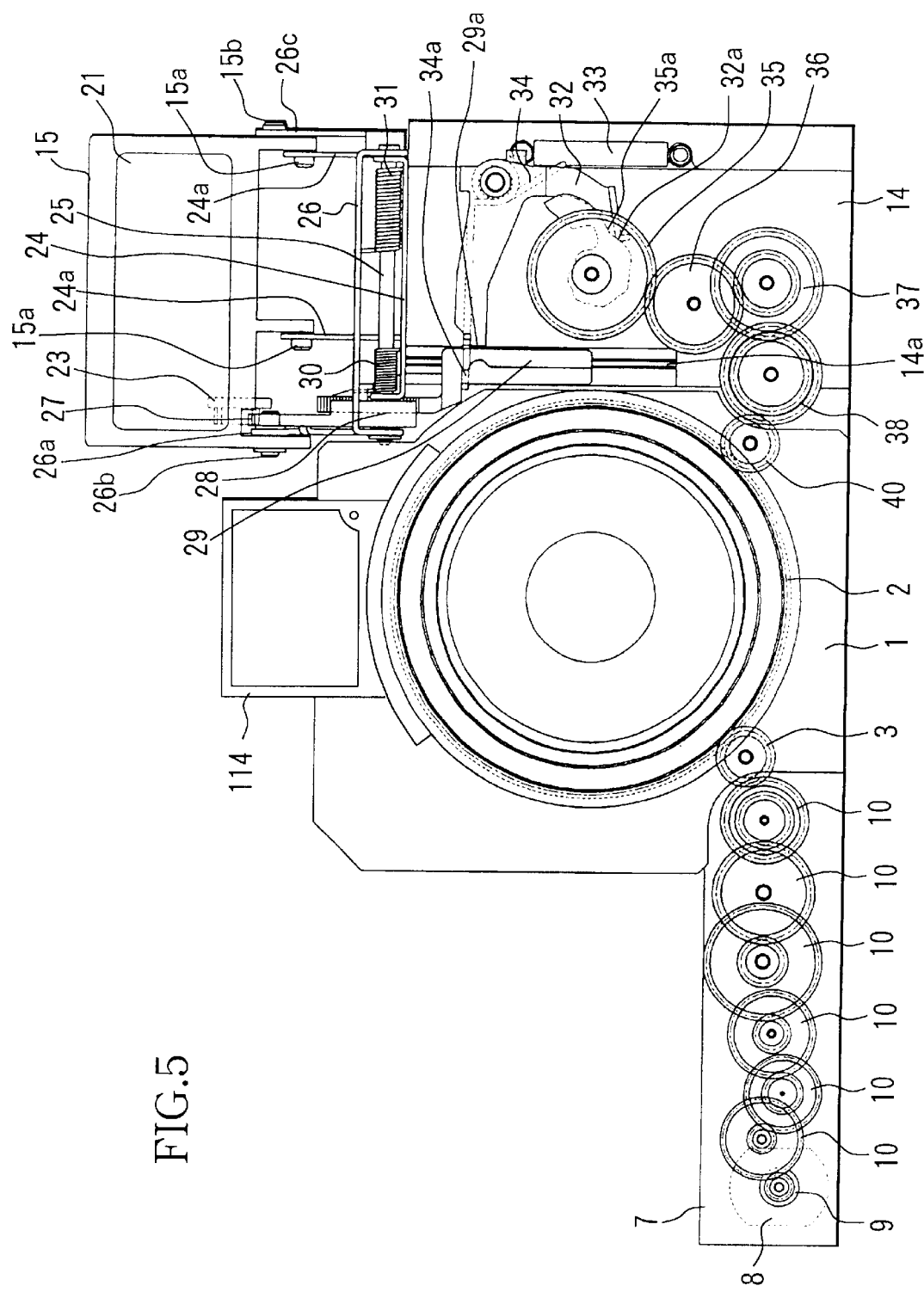
FIG. 5 is a front view showing the schematic mechanism of the abovementioned camera in the condition where the lens barrel is at the wide position.
Figure 6:
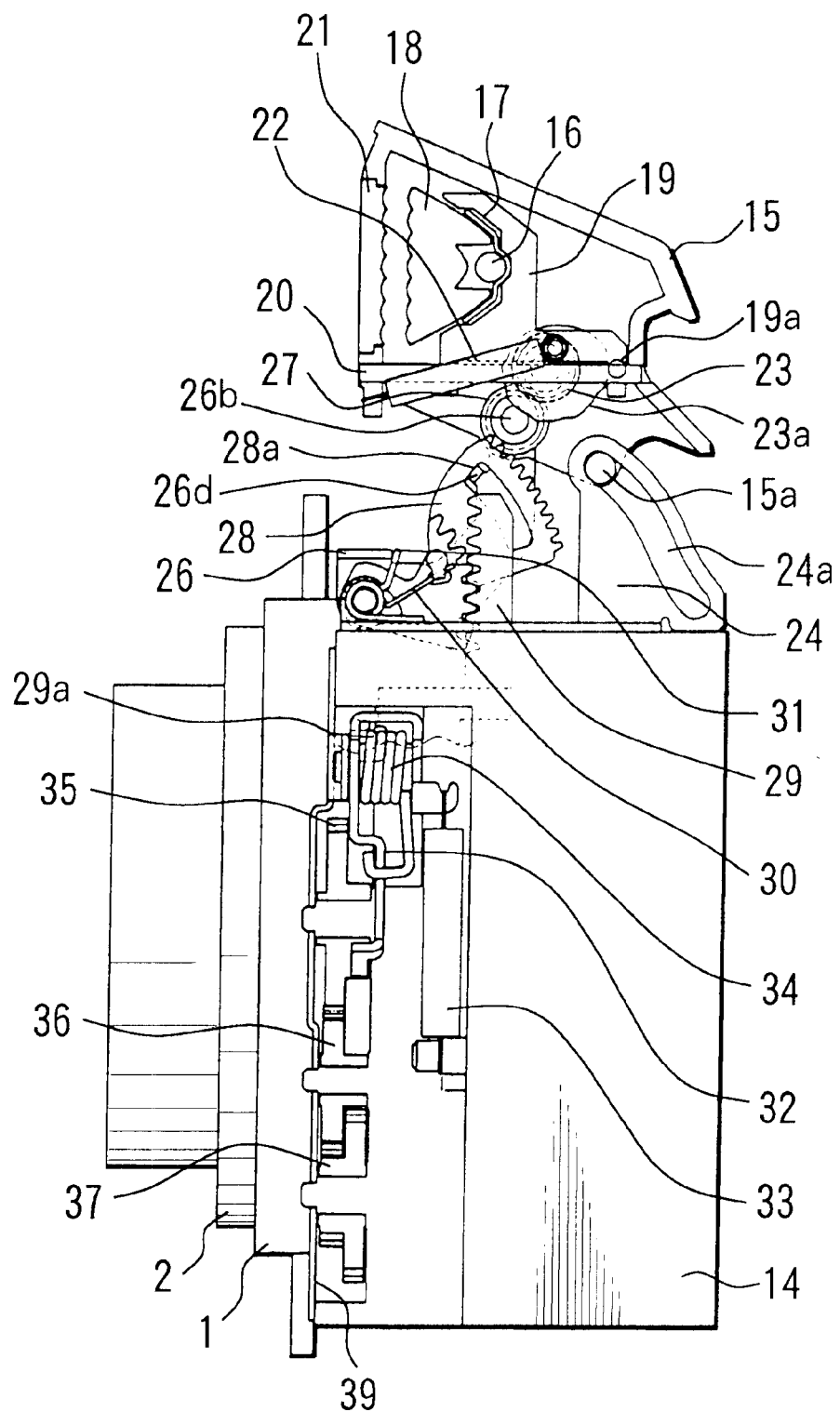
FIG. 6 is a side view showing the schematic mechanism of the abovementioned camera in the condition where the lens barrel is at the wide position.
Figure 7:
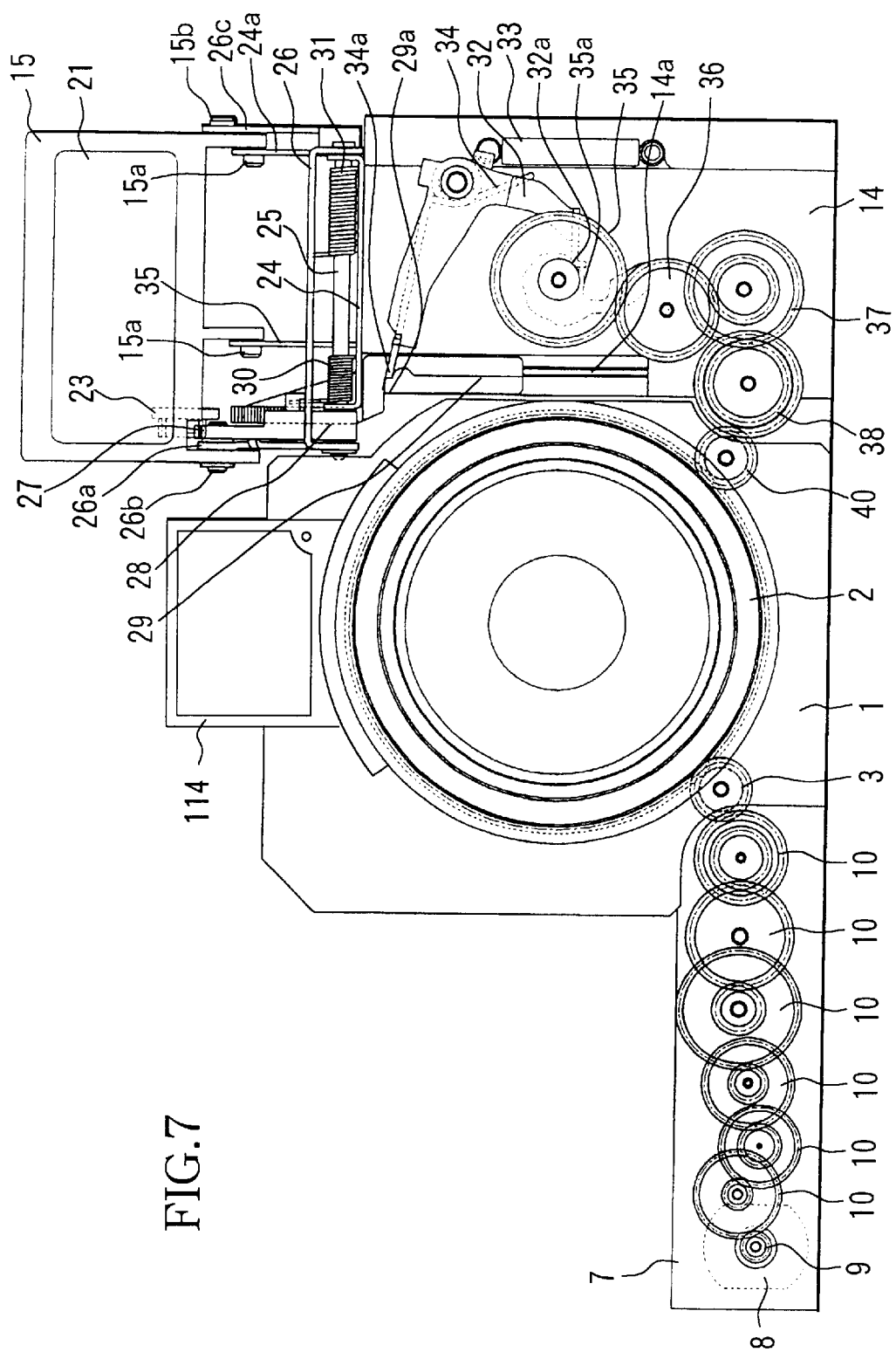
FIG. 7 is a front view showing the schematic mechanism of the abovementioned camera in the condition where the lens barrel is at the tele position.
Figure 8:
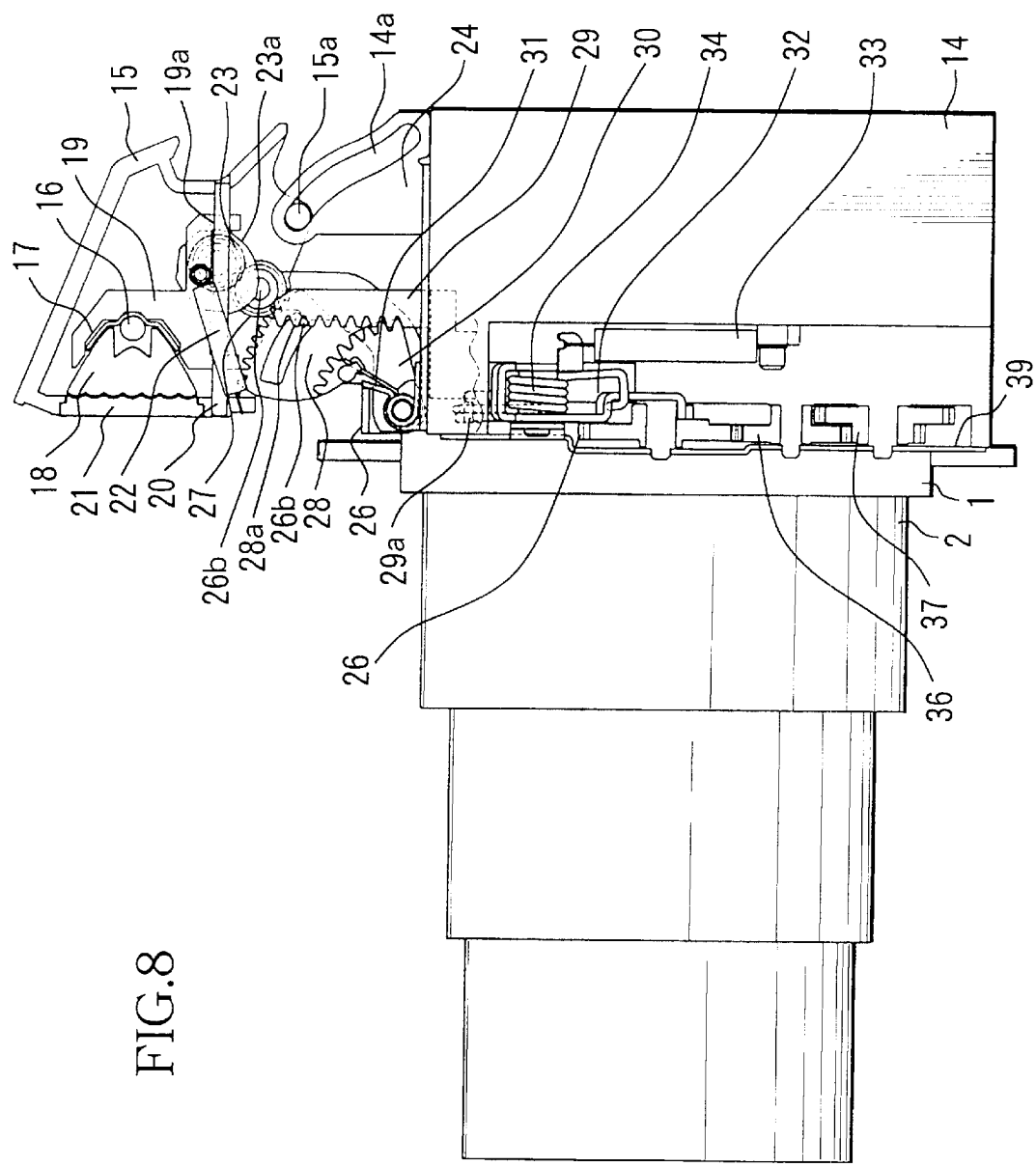
FIG. 8 is a side view showing the schematic mechanism of the abovementioned camera in the condition where the lens barrel is at the tele position.

Next, the zoom strobe device is explained with reference to FIG. 3 through FIG. 8. FIG. 4 shows the condition where the lens barrel draws in the camera, and FIG. 5 and FIG. 6 show the condition where the lens barrel is at the wide-end, and FIG. 7 and FIG. 8 show the condition where the lens barrel is at the tele-end.

Camera body 14 holds the fixed lens barrel 1 and a strobe mechanism described later, strobe case 15 holds a light emitting source and Fresnel lens 21 comprising a strobe light emitting window that are described later. This strobe case 15 can be protruded from and housed in the camera body 14 by a popup mechanism described later. A strobe light emitting part is comprised of a light emitting source, Fresnel lens 21, and strobe case 15.

The light emitting source is comprised of Xe tube 16 and reflecting shade 17, and light guide 18, and is held by holder 19. The holder 19 is movably held by zoom guide shaft 20 in the strobe optical axial direction. The holder 19 is pressed by holder spring 22, and the contact shaft 19a provided on the holder 19 is biasedly contacted with cam surface 23a of holder cam gear 23 held by the strobe case 15.

Strobe base plate 24 is fixed on the camera body 14. The camshaft 15a of the strobe case 15 engages cam groove 24a formed in this strobe base plate 24.

Rotating shaft 25 is held by the strobe base plate 24. Arm 26 is held by the rotating shaft 25, and shaft 26b provided at one end 26a of this arm 26 fits the hole of the strobe case 15 while holding arm gear 27. A hole formed at the other end 26c of the arm 26 fits with supporting shaft 15b of the strobe case 15.

Sector gear 28 transmits a drive force of a rack 29, which moves straightly on rail 14a formed on the camera body 14, to the arm gear 27. Sector spring 30 biases the sector gear 28 counterclockwise in the side view of FIG. 2 and so on, and biases the rack 29 upward.

UP spring 31 biases the arm 26 counterclockwise in the side view. Lever 32 is pressed by lever spring 33, and contact portion 32a is biasedly contacted with the cam surface 35a formed on interlocking cam gear 35.

Absorbing spring 34 is held by the lever 32, and converts the rotational motion of the lever 32 into a rectilinear motion of the rack 29 when the front end 34a of the spring comes into contact with the contact surface 29a of the rack 29.

Drive gear 40 engages with the gear portion formed on the outer circumference of the cam barrel 2 that is rotatable, and interlocking gears 36 through 38 transmit the turning force of the drive gear 40 to the interlocking cam gear 35. Presser plate 39 holds and presses the rack 29, lever 32, interlocking cam gear 35, and interlocking gears 36 through 38 against the camera body 14.

The driven gear 40, interlocking gears 36 through 38, interlocking cam gear 35, lever 32, rack 29, sector spring 30, absorbing spring 34, sector gear 28, arm 26, UP spring 31, arm gear 39 and holder cam gear 23 are equivalent to alight distribution angle changing mechanism.

Figure 9:
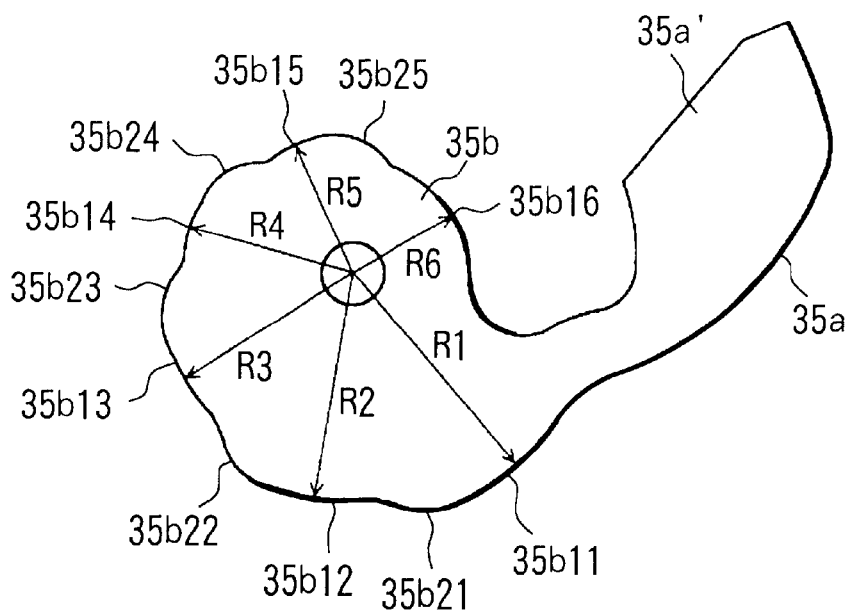
FIG. 9 is an explanatory view of the form of the interlocking cam gear comprising the light distribution angle changing mechanism of the abovementioned camera.

Herein, the form of the cam portion (light distribution angle changing cam member) formed integrally with the interlocking cam gear 35 is explained with reference to FIG. 9. This cam portion is formed around the axis of the interlocking cam gear 35, and is comprised of strobe zoom cam portion 35b for cam-driving the lever 32 to change the strobe light distribution angle in accordance with the zooming condition of the lens barrel as described later, and extending portion 35a' that extends from a part of the strobe zoom cam portion 35b and has cam surface 35a for cam-driving the lever 32 to pop-up and pop-down the strobe as described later.

At the outer circumference of the strobe zoom cam portion 35b, in order from the side adjacent to the cam surface 35a, first light distribution angle unchangeable region 35b11 having a constant rift R1, first light distribution angle changing cam region 35b21 in which the rift decreases from R1 to R2, second light distribution angle unchangeable region 35b12 having a constant rift R2, second light distribution angle changing cam region 35b22 in which the rift decreases from R2 to R3, third light distribution angle unchangeable cam region 35b13 having a constant rift R3, third light distribution angle changing cam region 35b23 in which the rift decreases from R3 to R4, fourth light distribution angle unchangeable cam region 35b14 having a constant rift R4, fourth light distribution angle changing cam region 35b24 in which the rift decreases from R4 to R5, fifth light distribution angle unchangeable cam region 35b15 having a constant rift R5, fifth light distribution angle changing cam region 35b25 in which the rift decreases from R5 to R6, and sixth light distribution angle unchangeable cam region 35b16 having a constant rift R6 are formed.

Furthermore, the lever 32 comes into contact with the first light distribution angle changing cam region 35b21 when the lens is positioned in the WIDE-M1 zooming drive cam regions shown in FIG. 2, the second light distribution angle changing cam region 35b22 when the lens is positioned in the M1–M2 zooming drive cam regions, the third light distribution angle changing cam region 35b23 when the lens is positioned in the M2–M3 zooming drive cam regions, the fourth light distribution angle changing cam region 35b24 when the lens is positioned in the M3–M4 zooming drive cam regions, and the fifth light distribution angle changing cam region 35b25 when the lens is positioned in the M4-TELE zooming drive cam regions.

Also, the lever 32 comes into contact with the first light distribution angle unchangeable cam region 35b11 when the lens is positioned in the WIDE focusing drive cam region shown in FIG. 2, the second light distribution angle unchangeable cam region 35b12 when the lens is positioned in the M1 focusing drive cam region, the third light distribution angle unchangeable cam region 35b13 when the lens is positioned in the M2 focusing drive cam region, the fourth light distribution angle unchangeable cam region 35b14 when the lens is positioned in the M3 focusing drive cam region, the fifth light distribution angle unchangeable cam region 35b15 when the lens is positioned in the M4 focusing drive cam region, and the sixth light distribution angle unchangeable cam region 35b16 when the lens is positioned in the TELE focusing drive cam region.

Furthermore, non-focusing drive cam regions t are formed between zooming drive cam regions z and focusing drive cam regions f in the cam grooves 2c and 2d of the cam barrel 2 as mentioned above, and the light distribution angle changing cam regions of the strobe zoom cam portion 35b of the present embodiment correspond to the zooming drive cam regions z, and the light distribution angle unchangeable cam regions correspond to the non-focusing drive cam regions t and focusing drive cam regions f.

Next, the operation of the camera constructed as mentioned above is explained. First, the case where the lens barrel protrudes to the wide end from the housed condition is explained.

When a main switch (not shown) is turned ON from the condition shown in FIG. 3 and FIG. 4, the lens barrel starts driving via the gear rows 10 upon power supply to the motor 8. Then, via the cam barrel 2, drive gear 40, and interlocking gears 36 through 38, the interlocking cam gear 35 rotates counterclockwise in FIG. 3. Therefore, the lever 32 rotates along the cam surface 35a together with the absorbing spring 34 in the clockwise direction in FIG. 3.

Then, as the front end 34a of the absorbing spring 34 that presses the contact surface 29a of the rack 29 moves upward, the rack 29 moves up by means of the pressing force of the sector spring 30, and the sector gear 28 engaging with this rack 29 rotates in the counterclockwise direction in FIG. 4. Thereby, the arm gear 27 engaging with the sector gear 28 becomes rotatable.

Thereby, the arm 26 holding the arm gear 27 rotates in the counterclockwise direction in FIG. 4 by means of the pressing force of the UP spring 31, and furthermore, the strobe case 15 that is fit and held by both front ends of the arm 26 starts to pop-up along the cam 24a of the strobe base plate 24.

Then, the condition becomes the wide end zooming condition and strobe pop-up condition shown in FIG. 5 and FIG. 6, a control circuit that is not shown detects the wide position via the zooming position detection switch that is not shown, causes the motor 8 to supply braking power to the lens barrel to stop protruding, and stops the lens barrel and strobe at the wide position. In this condition, the camera is able to carry out photography.

Next, the case where the photographic lens carries out zooming from the wide end to the tele end is explained. When a zoom switch that is not shown is tele-operated from the condition shown in FIG. 5 and FIG. 6, the lens barrel starts driving and rotating. Thereby, the interlocking cam gear 35 rotates in the counterclockwise direction in FIG. 5, and the contact position between the lever 32 and interlocking cam gear 35 shifts from the cam surface 35a side to the strobe zoom cam portion 35b side. Every time the contact position shifts toward the light distribution angle changing cam regions 35b21 through 35b25 via the first light distribution angle unchangeable cam region 35b11, the lever 32 rotates stepwise in the clockwise direction in FIG. 5. Then, every time the lever 32 rotates clockwise, the sector gear 28 rotates in the counterclockwise direction in FIG. 6.

When the lens barrel is driven from the housed condition to the wide end, the strobe case 15 pops-up along the cam 24a, however, at the point of the wide end, the cam 24a portion ends, and the strobe case 15 cannot pop-up over this point, so that the turning force of the sector gear 28 is transmitted to the holder cam gear 23 via the arm gear 27. When the holder cam gear 23 rotates, the holder 19 protrudes toward the subject direction along the cam surface 23a provided on the cam gear 23. Thus, by narrowing stepwise the space between the light emitting source and Fresnel lens 21, a strobe light distribution angle and guide number corresponding to each zooming position (zooming step) can be obtained.

Then, when the condition becomes the tele-end zooming condition shown in FIG. 7 and FIG. 8, the control circuit detects the tele position by the zooming position detection switch, and causes the motor 8 to supply braking power to the lens barrel and stop the barrel, and stops the lens barrel and strobe at the tele position.

Next, the case where the photographic lens carries out zooming from the tele end to the wide end is explained. When the zoom switch that is not shown is operated from the condition shown in FIG. 7 and FIG. 8, the lens barrel starts driving. Thereby, the interlocking cam gear 35 rotates clockwise in FIG. 7, the contact position between the lever 32 and interlocking cam gear 35 shifts from the fifth light distribution angle changing cam region 35b25 toward the first light distribution angle changing cam region 35b21, and every time the contact position shifts in the distribution light angle unchangeable cam regions 35b25 through 35b21, the lever 32 rotates stepwise in the counterclockwise direction in FIG. 7. Every time the lever 32 rotates counterclockwise, the sector gear 28 rotates clockwise in FIG. 7.

The turning force of the sector gear 28 is transmitted to the holder cam gear 23 via the arm gear 27, and when the holder cam gear 23 rotates, the holder 19 is drawn along the cam surface 23a toward the side opposite to the subject side. Thus, as the space between the light emitting source and Fresnel lens 21 becomes stepwise wider, a light distribution angle and guide number corresponding to each zooming position (zooming step) can be obtained.

Then, when the condition becomes the wide end zooming condition shown in FIG. 5 and FIG. 6, the wide position is detected by the zooming position detection switch that is not shown, and after the elapse of a predetermined time, the motor 8 is caused to supply braking power to the lens barrel and stop the barrel, whereby the lens barrel and strobe are stopped at the wide position.

Next, the case where the photographic lens draws from the wide end to the housed condition is explained. From the condition shown in FIG. 5 and FIG. 6, when the main switch that is not shown is turned OFF, contrary to the case where the lens is driven from the housed condition to the wide end, the interlocking cam gear 35 rotates clockwise in FIG. 5, and the lever 32 rotates counterclockwise in FIG. 5 along the cam surface 35a together with the absorbing spring 34.

Then, when the contact surface 29a of the rack 29 is pressed by the front end 34a of the absorbing spring 34, the rack 29 moves down against the pressing force of the sector spring 30, and the sector gear 28 starts rotating clockwise in FIG. 5. When the sector gear 28 continuously rotates clockwise, the contact surface 28a comes into contact with stopper 26d of the arm 26, and after that, the arm 26 rotates clockwise under interlocking with the rotation of the sector gear 28.

When the arm 26 starts rotating clockwise, the strobe case 15 starts popping-down along the cam 24a.

Thus, the control circuit detects the housed position by the zooming position detection switch, and after the elapse of a predetermined time, causes the motor 6 to supply braking power and stop the lens barrel, and then, the condition becomes the housed and pop-down condition shown in FIG. 1 and FIG. 2, and the lens barrel and strobe are housed in the camera and photography becomes impossible.

Figure 10:
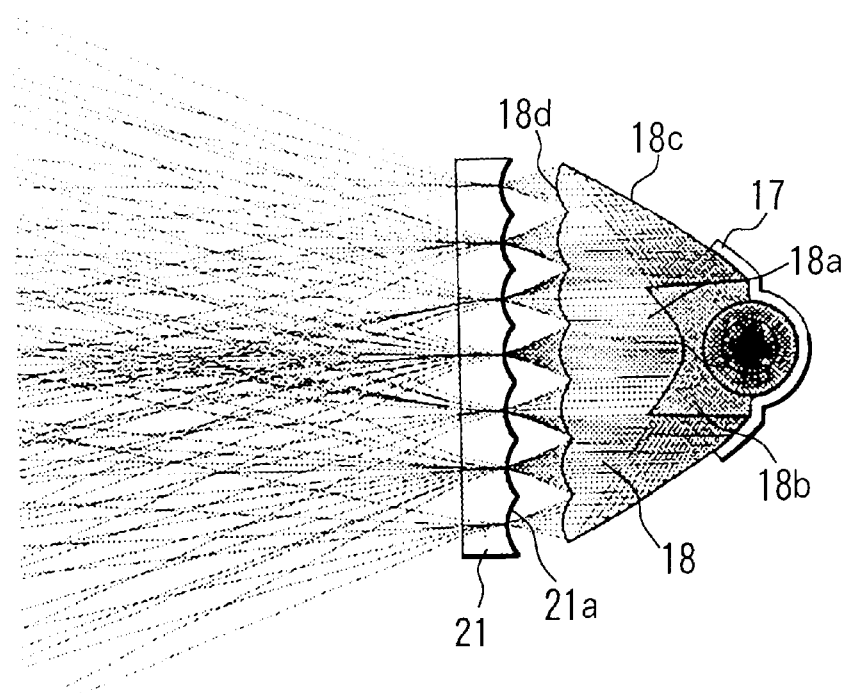
FIG. 10 is a detailed drawing in the wide condition of the strobe light emitting part of the abovementioned camera.
Figure 11:
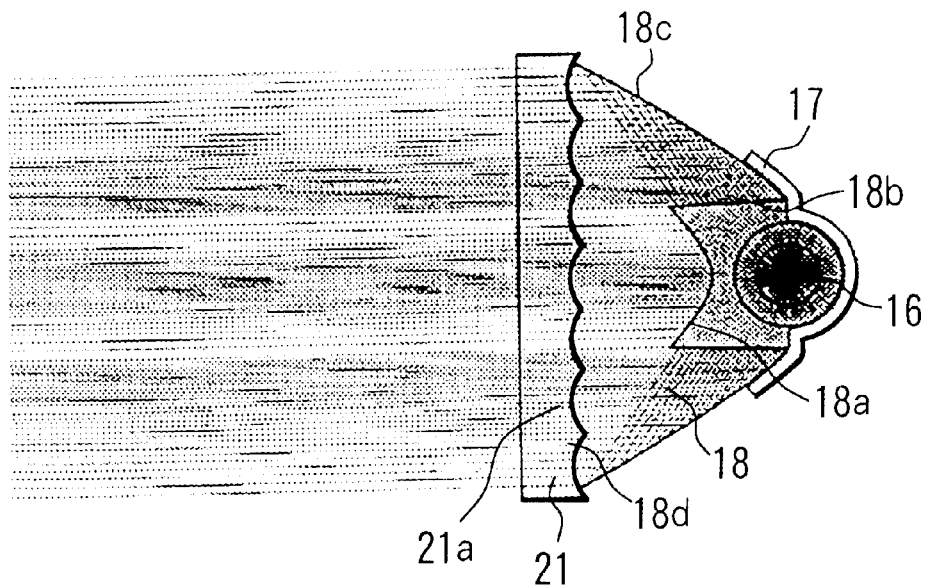
FIG. 11 is a detailed drawing in the tele condition of the strobe light emitting part of the abovementioned camera.

Herein, operation of the strobe light emitting part for changing the light distribution angle under interlocking with the zooming operation of the lens barrel is explained with reference to FIG. 10 and FIG. 11. FIG. 10 shows the condition of the light emitting part when wide-zooming, and FIG. 11 shows the condition of the light emitting part when tele-zooming. In these figures, the condition of light fluxes emitted from the Xe tube 16 is shown.

In these figures, light fluxes emitted from the Xe tube 16 are made incident on incidence surface 18a of light guide 18. The incidence surface 18a is set curved so that, after the light fluxes emitted forward from the center of the Xe tube 16 are made incident on the surface, the fluxes become roughly parallel.

The incidence surface 18b refracts outward the light fluxes that have been emitted upward, downward, and diagonally from the center of the Xe tube 16, and directs the fluxes toward reflecting surface 18c. The reflecting surface 18c is curved so as to totally reflect the light fluxes from the incidence surface 18b, and directs the light fluxes toward the subject side as roughly parallel light fluxes inside the light guide 18.

The reflecting shade 17 has a cylindrical portion concentric with the axis of the Xe tube 16, so that the light fluxes emitted rearward from the Xe tube 16 are reflected by the reflecting shade 17, pass through the inside of the Xe tube 16 again, and then are made incident on the incidence surfaces 18a and 18b of the light guide 18, and trace the same path as that of the light fluxes that have been directly made incident on the light guide 18.

Light fluxes emitted from positions deviating from the center of the Xe tube 16 trace almost the same path as that of the light fluxes emitted from the center, however, when the fluxes are refracted or reflected, in accordance with the amount of deviation, the refraction or reflection angle deviates, so that the light fluxes advance toward the subject direction with slightly diffusing angles. However, in terms of the entirety of the Xe tube 16, the forms of the incidence surfaces and reflecting surfaces are set so that light fluxes advance toward the subject direction with extremely small angles with respect to the optical axis.

Light fluxes emitted from the Xe tube 16 advance inside the light guide 18, and then are made to exit from exit surface 18d. This exit surface 18d is comprised of a convex cylindrical lens, and the incidence surface 21a of the Fresnel lens on which the light fluxes pass next is comprised of a concave cylindrical lens. Therefore, the light fluxes are refracted and condensed by the convex lens when they are made to exit, and then refracted by the concave lens toward the direction in which the condensed light is restored.

In the wide condition shown in FIG. 10, the position of the light guide 18 is set so that the focal point of the convex cylindrical lens 18d is near the apex of the concave cylindrical lens 21a, and after condensing the light, the light passes through the inside of the Fresnel lens 21 in a diffused condition, and advances toward the subject direction with a wide irradiation angle.

On the other hand, in the tele condition shown in FIG. 11, the position of the light guide 18 is set so that the convex cylindrical lens 18d and concave cylindrical lens 21 are almost closely contacted with each other. In this condition, light fluxes that have exited from the convex cylindrical lens 18d are made incident on almost the symmetric position of the concave cylindrical lens 21a, so that the light fluxes are refracted toward the original direction by almost the same angle as the refracting angle by the convex cylindrical lens 18d. Therefore, a condition equivalent to the condition where the convex cylindrical lens 18d and concave cylindrical lens 21a do not exist is created, and the light fluxes are irradiated while an extremely small light distribution angle is maintained by control of the light guide 18.

Thus, the focal length can be changed by a convex lens and a concave lens to control the light distribution angle. That is, by moving the Xe tube 16, reflecting shade 17, and holder 19 holding the light guide 18 in the optical axial direction, the space between the light guide 18 and Fresnel lens 21 is changed so as to become wide when wide-zooming, and become narrow when tele-zooming. Thereby, a strobe light distribution angle and guide number corresponding to each zooming position can be obtained.

Figure 12:
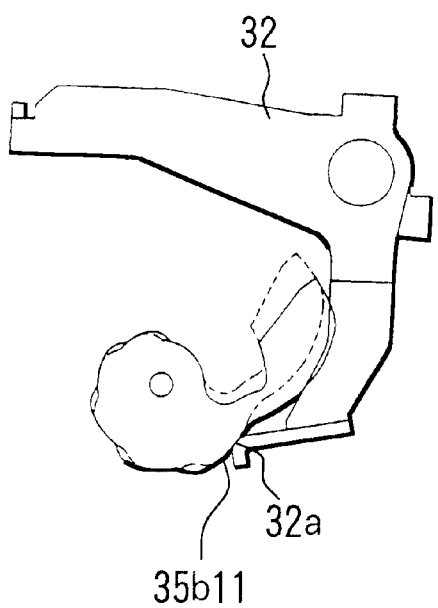
FIG. 12 is a detailed drawing when the interlocking cam gear carries out wide-focusing operation.

Next, the strobe operation when focusing at each zooming position is explained. Herein, for example, at the wide position shown in FIG. 5 and FIG. 6, an explanation is provided on the supposition that the strobe zoom cam portion 35b of the interlocking cam gear 35 and the lever 32 at the positions shown by the solid lines in FIG. 12, that is, the lever 32 is at a position contacted with the portion (infinity side) near the end in the counterclockwise direction of the first light distribution unchangeable cam region 35b11.

When focusing is carried out toward the close side from this condition, the lens barrel starts driving, and as in the case where the lens barrel is driven from the wide end to the tele end, the interlocking cam gear 35 rotates counterclockwise via the cam barrel 2, drive gear 40, and interlocking gears 36 through 38. When focusing is carried out to the closest position, the interlocking cam gear 35 (strobe zoom cam portion 35b) rotates to the position shown by the dotted line in FIG. 12, and at this time, the lever 32 is still contacted with the portion near the end in the clockwise direction of the first light distribution angle unchangeable cam region 35b16.

Figure 13:
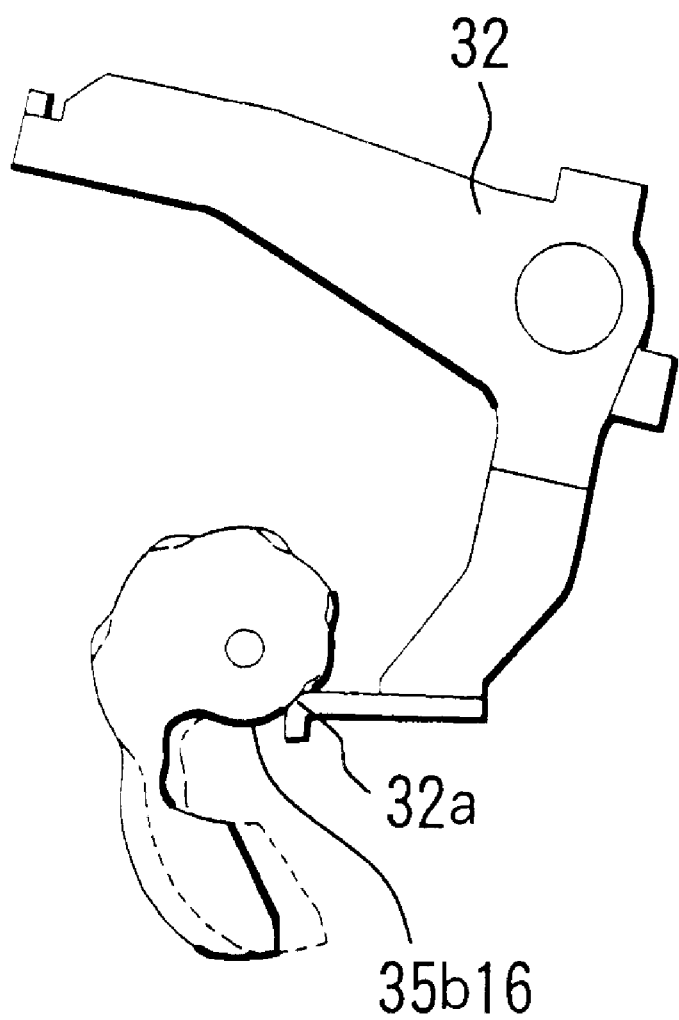
FIG. 13 is a detailed drawing when the interlocking cam gear carries out tele-focusing operation.

At the tele position shown in FIG. 7 and FIG. 8, when the strobe zoom cam portion 35b of the interlocking cam gear 35 and the lever 32 carry out focusing from the positions shown by the solid lines in FIG. 13, that is, from the condition where the lever 32 is at the position contacted with the portion (infinity side) near the end in the counterclockwise direction of the sixth light distribution angle unchangeable cam region 35b16 toward the closest side, the lens barrel starts driving, as the same as the case where zooming is carried out from the wide end to the tele end, and the interlocking cam gear 35 rotates counterclockwise via the cam barrel 2, drive gear 40, and interlocking gears 36 through 38.

Focusing is carried out to the closest position, the interlocking cam gear 35 (strobe zoom cam portion 35b) rotates to the position shown by the dotted line in FIG. 13. At this time, the lever 32 is still contacted with the portion near the end in the clockwise direction of the sixth light distribution angle unchangeable cam region 35b11. The same can also be applied to the case where focusing is carried out at other intermediate zooming positions.

In short, even when focusing is carried out between the closest range and infinity at each zooming position, the contact position between the lever 32 and strobe zoom cam portion 35b changes in only each light distribution angle unchangeable cam region in which the rift is constant, so that the lever 32 does not rotate. Then, if the lever 32 does not rotate, the holder 19 does not protrude toward the subject side or draw in the opposite direction, but remains as it stops, so that the light distribution angle and guide number do not change due to focusing.

Figure 16:
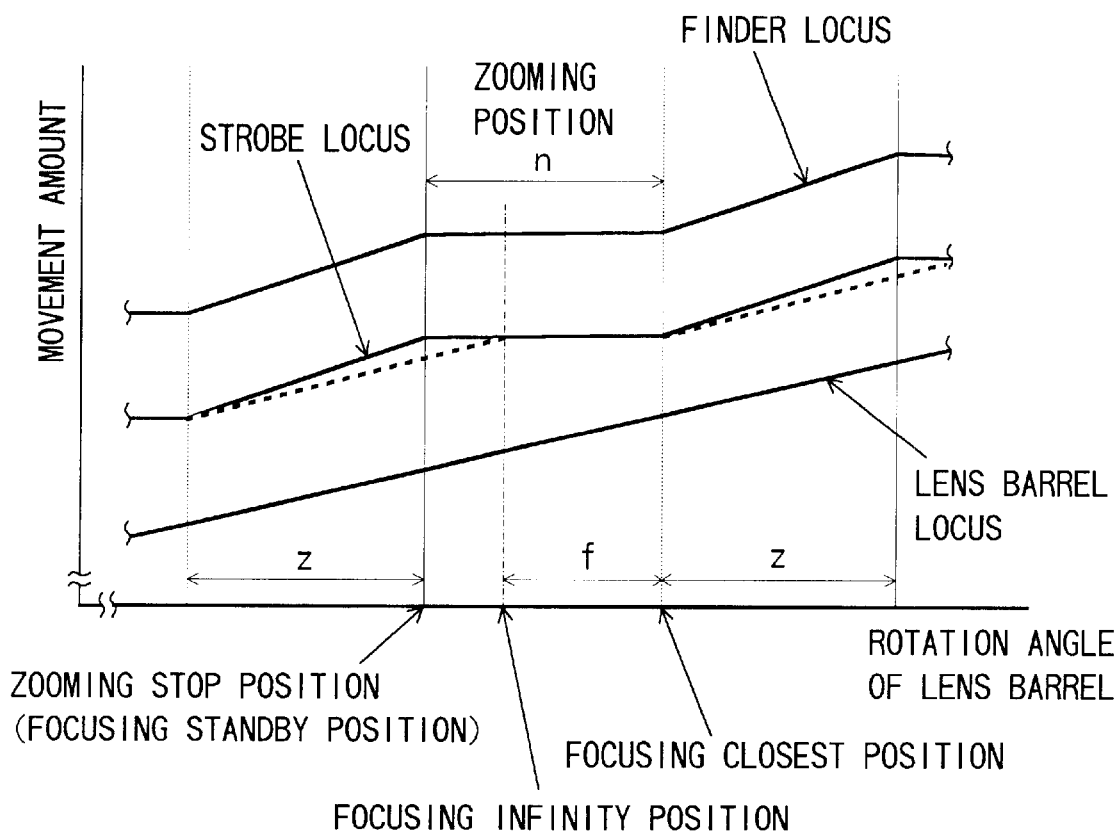
FIG. 16 is a graph showing the relationship of the operation of the lens barrel, strobe light distribution angle, and finder field angle substituted by the relationship in movement of the components of the mechanism.

Herein, the relationships between the operation of the lens barrel and the strobe light distribution angle unchangeable regions are explained in detail with reference to FIG. 16. FIG. 16 shows the relationships between the angle of rotation (horizontal axis) of the cam barrel 2 and the amount of movement (vertical axis) of the mechanisms near the zooming position n. The locus of the lens barrel shows the protrusion amount of the first lens unit, and the locus of the strobe shows the rotation amount of the lever 32.

As mentioned above, in the camera of the present embodiment, while the photographic lens is in a condition where the lens engages in the non-focusing drive cam region t and focusing drive cam region f, that is, when the lens is between the zooming stop position (focusing standby position) and focusing closest position, in order to prevent the lever 32 from rotating, zoom cam surface 35a of the interlocking cam gear 35 is provided. Thereby, the strobe light distribution angle is unchangeable from the focusing standby position to the focusing closest position.

However, when the strobe is used for camera-photography, the photographic lens engages in the focusing drive cam region f (from the focusing infinity position to the focusing closest position). Therefore, it is not necessary to make the strobe light distribution angle unchangeable between the focusing standby position and focusing infinity position. Accordingly, as shown by the dotted line in FIG. 16, the strobe light distribution angle unchangeable region may be just accorded with the focusing drive cam region f. That is, the light distribution angle changing cam regions of the strobe zoom cam portion 35b are accorded with the zooming drive cam region z and non-focusing drive cam region t, and the light distribution angle unchangeable cam regions are accorded with the focusing drive cam region f.

Thereby, the cam angle (the ratio of rift change) between the zooming positions can be made gentle, the drive load required for changing the strobe light distribution angle can be reduced.

In addition, instead of making the cam angle gentle, the cam size can be reduced until the cam angle becomes to the same degree, and thereby, the light distribution angle changing mechanism can be further reduced in size.

Figure 14:
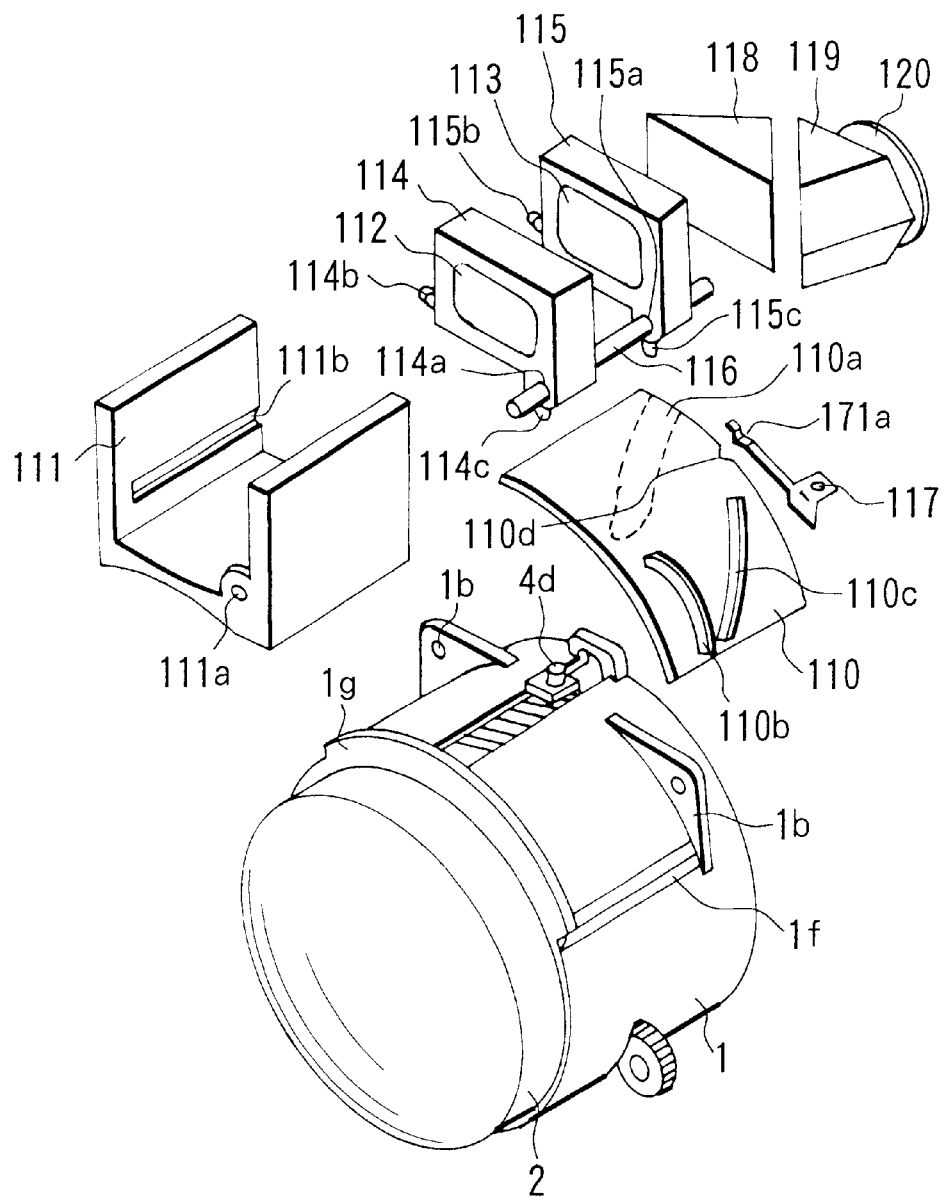
FIG. 14 is a perspective view of the finder optical system and field angle changing mechanism of the abovementioned camera.

Next, the finder optical system for zooming under interlocking with zooming of the photographic lens is explained with reference to FIG. 14.

At the upper part of the fixed lens barrel 1, finder cam plate (finder drive cam member) 110 is provided, and the range of movement of this finder cam plate 110 is restricted by projections 1f and 1g formed so as to extend in the optical axial direction on the outer circumference of the fixed lens barrel 1 and flange portions 1b and 1g formed at the front and rear parts of the outer circumference of the fixed lens barrel 1. Therefore, the plate is movable in only the circumferential direction along the outer circumference of the fixed lens barrel 1.

The finder cam plate 110 is pressed from above by finder base plate 111. Objective lens frames 114 and 115 hold finder objective lens groups 112 and 113, and holes 114a and 115a are made in the objective lens frames 114 and 115. The finder guide bar 116 penetrates and fits into the holes 114a and 115a.

This finder guide bar 116 is held in the hole 111a formed at the front end of the finder base plate 111, and guides the finder objective lens groups 112 and 113 (lens frames 114 and 115) forward and rearward in the optical axial direction.

In order to prevent the objective lens frames 114 and 115 from rotating, dowel parts 114b and 115b formed in the objective lens frames 114 and 115 fit in groove 111b that is formed so as to extend in the optical axial direction in the finder base plate 111.

First cam groove 110a is formed in the backside (opposite side of the fixed lens barrel 1) of the finder cam plate 110, and the cam pin 4d of the rectilinear barrel 4 engages in this first cam groove 110a.

Furthermore, second and third cam grooves 110b and 110c are formed in the finder cam plate 110, and cam follower parts 114c and 115c of the objective lens frames 114 and 115 engage in these second and third cam grooves 110b and 110c.

The cam pin 4d, finder cam plate 110, and cam follower parts 114c and 115c of the objective lens frames 114 and 115 comprise a field angle changing mechanism.

Figure 15:
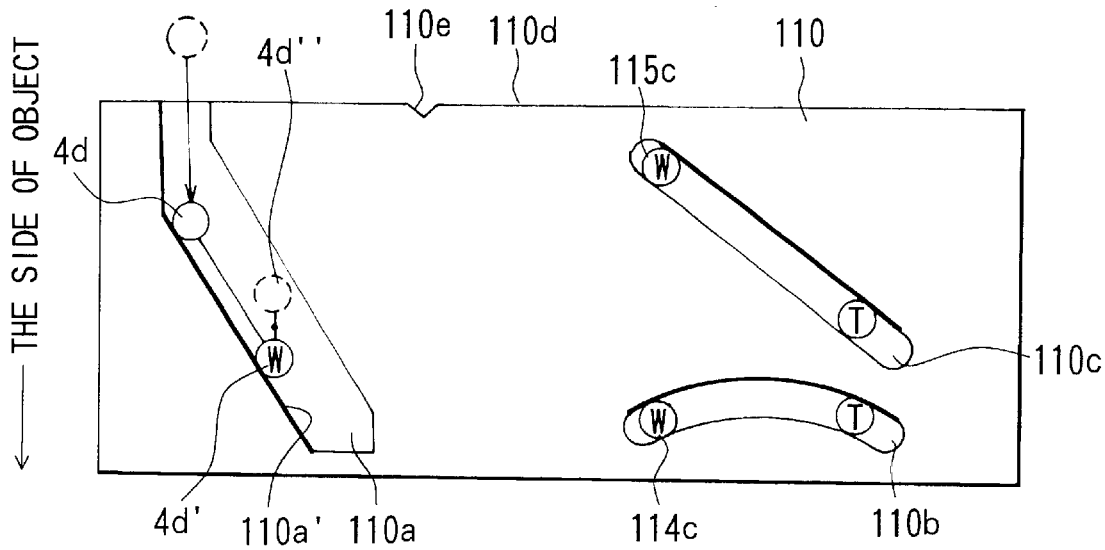
FIG. 15 is a developed view of the finder cam plate comprising the field angle changing mechanism.

Herein, FIG. 15 shows the developed view of the finder cam plate 110. The cam pin 4d disengages from the first cam groove 11a when the lens barrel is at the housed position (at the position shown by the circular dotted line in the figure). At the wide end, the pin reaches the position shown by the circled "W" in the figure in the first cam groove 110a.

At this time, the cam follower parts 114c and 115c are at the positions shown by the circled "W" in the figure in the second and third cam grooves 110b and 110c. Even when the lens barrel is at the housed position, the cam follower parts 114c and 115c are still at the same positions as in the case of the wide end position.

When the lens barrel is protruded, in the finder cam plate 110, the cam pin 4d moves in the left direction in FIG. 15 with respect to the cam follower parts 114c and 115c, and at the tele end, the cam pin 4d and cam follower parts 114c and 115c move to the positions shown by the circled "T" in the figure with respect to the finder cam plate 110. Therefore, the lens frames 114 and 115 are guided by the cam grooves 110b and 110c and move in the optical axial direction.

As described above, when the lens barrel is at the housed position, the cam pin 4d which interlocks the rectilinear barrel 4 and finder cam plate 110 disengages from the first cam groove 110a, and the finder cam plate 110 becomes free in the circumferential direction, and therefore, in order to fix this finder cam plate 110, cam plate fixing spring 117 is provided.

Concretely, projection 117a of the cam plate fixing spring 117 engages to V groove 110e formed at the end face 110d of the finder cam plate 110 to hold the finder cam plate 110 from the housed position to the wide position.

Between the wide end and tele end, the end face 110d of finder cam plate 110 and cam plate fixing spring 117 come into contact with each other, a frictional force acts between them, whereby the finder cam plate 110 is held.

Light fluxes that have passed through the finder objective lens groups 112 and 113 pass through the triangular prism 118, and then the image of the light fluxes is formed between the prism and roof prism 119. Therefore, the photographer can view the finder image through the roof prism 119 and eyepiece 120.

In the finder optical system thus constructed, during zooming by means of the abovementioned zoom sequence of the photographic lens for each zooming position (as shown in FIG. 2, the photographic lens is moved to the outside of the focusing drive cam region f over the zooming drive cam region z and then returned to the focusing standby position), until the photographic lens is moved to the outside of the focusing drive cam region f over the zooming drive cam region z, the cam pin 4d moves along the cam surface 110a' of the first cam groove 110a to move the finder cam plate 110 leftward in FIG. 15. Therefore, the lens barrel and the finder optical system interlock with each other, whereby a finder magnification (finder field angle) corresponding to the photographic magnification is automatically set.

Herein, as shown in FIG. 15, the first cam groove 110a of the finder cam plate 110 has a width much wider than the diameter of the cam pin 4d. On the other hand, during the zoom sequence, until the photographic lens is returned to the focusing standby position from the outside of the focusing drive cam region f, the cam barrel 2 rotates in the direction opposite to the direction in the case where the photographic lens moves to the outside of the focusing drive cam region f, and the cam pin 4d also moves in the opposite direction. Therefore, the cam pin 4d returns from 4d' to 4d" in the figure and stops.

Then, during focusing of the photographic lens, the cam pin 4d only moves between 4d' and 4d". Therefore, when focusing, the finder objective lenses 112 and 113 do not move, and focal length of the finder optical system does not do not change. Therefore, the photographer who looks into the finder does not have a feeling of incompatibility when focusing.

Next, the relationship between the operation of the lens barrel and the finder field angle unchangeable region is explained in detail with reference to FIG. 16. FIG. 16 shows the relationship between the angle of rotation (horizontal axis) of the cam barrel 2 near the zooming position n and a movement amount (vertical axis) in each mechanism, wherein the lens barrel locus shows the protrusion amount of the first lens group, and the finder locus shows the rotation amount of the finder cam plate 110.

In the present embodiment, as mentioned above, the form of the first cam groove 110a is set so as to prevent the finder cam plate 110 from rotating while the photographic lens engages in the non-focusing drive cam region t and focusing drive cam region f, that is, between the zooming stop position (focusing standby position) and focusing closest position. Thereby, the finder field angle becomes unchangeable from the focusing standby position to the focusing closest position.

The abovementioned strobe light distribution angle may be made unchangeable in only the actual photographic range from the focusing infinity position to the focusing closest position, however, in order to make it possible for the photographer to always look into the finder, the finder field angle must be made unchangeable not only in the range from the focusing infinity position to the focusing closest position but also in the range from the focusing standby position to the focusing infinity position.

Therefore, as in the present embodiment, it is preferable that a construction is provided so as to prevent the finder cam plate 110 from rotating from the focusing standby position to the focusing closest position.

Furthermore, the construction of the light distribution angle changing mechanism and the field angle changing mechanism explained in the present embodiment is just one example, and other constructions may be employed.

Also, the invention can be applied to not only the lens shutter camera explained in the embodiment but also to various types of cameras including digital cameras, video cameras and the like that are provided with zoom lenses, zoom strobes, and zoom finders.

Furthermore, the invention may be composed by combining the abovementioned embodiment, modified examples, or technical factors for each as necessary.

As described above, according to the invention, in a camera having a so-called step-zooming type photographic optical system, a light distribution angle changing mechanism, which changes the light distribution angle of the strobe light emitting part under interlocking with zooming operations of the photographic optical system in the photographic optical system drive mechanism, and makes the light distribution angle of the strobe light emitting part unchangeable when carrying out focusing operations of the photographic optical system, and a field angle changing mechanism, which changes the field angle of the finder optical system under interlocking with zooming operations of the photographic optical system in the photographic optical system drive mechanism, and makes the field angle of the finder optical system unchangeable during focusing operations of the photographic optical system, are provided. Therefore, the strobe light distribution angle and finder field angle can be properly set in accordance with the set zooming step of the photographic optical system, and the strobe light distribution angle and finder field angle do not change when focusing the photographic optical system, so that unevenness in the guide number and strobe light distribution due to the focusing position and a provision of a feeling of incompatibility for the photographer who makes an observation through the finder can be prevented.

Furthermore, in the case where a non-focusing drive cam region in which the photographic optical system is prevented from carrying out focusing operations is provided between the zooming drive cam region and focusing drive cam region in the photographic drive cam for step-driving zoom of the photographic optical system, the field angle changing mechanism is constructed so as to change the field angle of the finder system when the photographic optical system drive mechanism drives the photographic optical system in the zooming drive cam region, and so as to make the field angle of the finder optical system unchangeable when the photographic optical system is driven in the non-focusing drive cam region and focusing drive cam region, whereby, even while the photographic optical system is driven in the non-focusing drive cam region, during which the photographer often makes an observation through the finder, the field angle of the finder system can be made unchangeable, and it is more securely prevented in providing a feeling of incompatibility for the photographer.

On the other hand, if the light distribution angle changing mechanism is constructed so as to change the light distribution angle of the strobe light emitting part when the photographic optical system drive mechanism drives the photographic optical system in the zooming drive cam region and non-focusing drive cam region, and so as to make the light distribution angle of the strobe light emitting part unchangeable when the drive mechanism drives the photographic optical system in the focusing drive cam region, in particular, in the case where a cam member (light distribution angle drive cam member) for drive of changing the strobe light distribution angle is used within the light distribution angle changing mechanism, the rift change for change of the light distribution angle between the zooming steps in this cam member can be moderate in accordance with the non-focusing drive cam region, whereby the drive load for the light distribution angle changing mechanism can be reduced.

What is claimed is:

1. A camera comprising:
a cam member made with a cam groove for moving lens units, where the cam groove has alternately variable power cam regions for movements for variable power of the lens units and focusing cam regions for movements for focusing of the lens units;
an illumination device whose light distribution angle is changeable;
a finder device whose field angle is changeable;
an illumination device drive mechanism, which changes the light distribution angle of the illumination device while the lens units move in said variable power cam regions for variable power, and makes the light distribution angle of the illumination device unchangeable while the lens units move in said focusing cam regions for focusing; and
a finder device drive mechanism, which changes the field angle of the finder device while the lens units move in said variable power cam regions for variable power, and makes the field angle of the finder device unchangeable while the lens units move in said focusing cam regions for focusing under interlocking with the drive of the cam member.

2. A camera according to claim 1, wherein
said finder device drive mechanism comprises at least two finder lens units and a finder cam member having cam grooves for sliding said finder lens units, and the finder device drive mechanism drives said finder cam member while the lens units move in said variable power cam regions for variable power, and does not drive the finder cam member while the lens units move in said focusing cam regions for focusing.

3. A camera comprising:
a photographic optical system drive mechanism which carries out stepwise variable power and focusing of a photographic optical system at each variable power position by using a drive cam alternately having variable power drive cam regions and focusing drive cam regions;
a strobe light emitting part whose light distribution angle is changeable;
a finder optical system whose field angle is changeable;
a light distribution angle changing mechanism, which changes the light distribution angle of the strobe light emitting part under interlocking with variable power operations of the photographic optical system in the photographic optical system drive mechanism, and makes the light distribution angle of the strobe light emitting part unchangeable when the photographic optical system operates for focusing; and
a field angle changing mechanism, which changes the field angle of the finder optical system under interlocking with variable power operations of the photographic optical system in the photographic optical system drive mechanism, and makes the field angle of the finder optical system unchangeable when the photographic optical system operates for focusing.

4. A camera according to claim 3, wherein
said light distribution angle changing mechanism is comprised of a light distribution angle changing cam member having cam regions in which the rift amount changes for changing the light distribution angle of the strobe light emitting part and cam regions in which the rift amount is constant, which are alternately formed.

5. A camera according to claim 4, wherein
said field angle changing mechanism is comprised of a finder drive cam member, which is driven by cam-engagement with the photographic optical system drive mechanism, and cam-drives the finder optical system to change the field angle, and
said finder drive cam member cam-engages with the photographic optical system drive mechanism when the photographic optical system drive mechanism operates for variable power of the photographic optical system, and the cam-engagement with the photographic optical system drive mechanism is released when the photographic optical system in the photographic optical system drive mechanism operates for focusing the photographic optical system.

* * * * *